US010961397B2

(12) United States Patent
Rentsch et al.

(10) Patent No.: US 10,961,397 B2
(45) Date of Patent: Mar. 30, 2021

(54) PROCESS FOR THE PREPARATION OF A MINERAL FILLER PRODUCT

(71) Applicant: Omya International AG, Oftringen (CH)

(72) Inventors: Samuel Rentsch, Spiegel bei Bern (CH); René Vinzenz Blum, St. Urban (CH); Patrick A. C. Gane, Rothrist (CH)

(73) Assignee: Omya International AG, Blue Ash, OH (US)

( * ) Notice: Subject to any disclaimer, the term of this patent is extended or adjusted under 35 U.S.C. 154(b) by 608 days.

(21) Appl. No.: 15/751,773

(22) PCT Filed: Aug. 19, 2016

(86) PCT No.: PCT/EP2016/069707
§ 371 (c)(1),
(2) Date: Feb. 9, 2018

(87) PCT Pub. No.: WO2017/032712
PCT Pub. Date: Mar. 2, 2017

(65) Prior Publication Data
US 2018/0230312 A1 Aug. 16, 2018

Related U.S. Application Data

(60) Provisional application No. 62/207,978, filed on Aug. 21, 2015.

(30) Foreign Application Priority Data

Aug. 21, 2015 (EP) .................... 15181911

(51) Int. Cl.
C09C 1/02 (2006.01)
C09C 3/04 (2006.01)
C09C 3/12 (2006.01)

(52) U.S. Cl.
CPC ............... C09C 1/021 (2013.01); C09C 3/04 (2013.01); C09C 3/12 (2013.01); C01P 2004/61 (2013.01); C01P 2006/22 (2013.01); C01P 2006/82 (2013.01); C01P 2006/88 (2013.01)

(58) Field of Classification Search
CPC ... C09C 1/021; C09C 3/04; C09C 3/12; C01P 2004/61; C01P 2006/22; C01P 2006/82; C01P 2006/88
See application file for complete search history.

(56) References Cited

U.S. PATENT DOCUMENTS

| 4,407,986 A | 10/1983 | Nomura et al. | |
|---|---|---|---|
| 2003/0027897 A1* | 2/2003 | Mei | C09C 1/3684 523/216 |
| 2004/0097616 A1 | 5/2004 | Hoppler et al. | |
| 2007/0167531 A1 | 7/2007 | Preston et al. | |
| 2010/0041811 A1* | 2/2010 | Gane | C08K 9/06 524/427 |
| 2013/0197142 A1 | 8/2013 | Buri et al. | |

FOREIGN PATENT DOCUMENTS

| CN | 1918072 A | 2/2007 | |
|---|---|---|---|
| CN | 102220033 A | 10/2011 | |
| EP | 0325114 A2 | 7/1989 | |
| EP | 0998522 A1 | 5/2000 | |
| EP | 1713725 A1 | 10/2006 | |
| EP | 1980588 A1 | 10/2008 | |
| EP | 2029677 A1 | 3/2009 | |
| EP | 2132268 A1 | 12/2009 | |
| EP | 2159258 A1 | 3/2010 | |
| EP | 2371766 A1 | 5/2011 | |
| EP | 2390280 A1 | 11/2011 | |
| EP | 2390285 A1 | 11/2011 | |
| EP | 2447213 A1 | 5/2012 | |
| EP | 2524898 A1 | 11/2012 | |
| EP | 2722368 A1 | 4/2014 | |
| EP | 2770017 A1 | 8/2014 | |
| EP | 2840065 A1 | 2/2015 | |
| EP | 2910610 A1 | 8/2015 | |
| GB | 2 355 453 * | 4/2001 | ............... C09C 3/12 |
| WO | 0020336 A1 | 4/2000 | |
| WO | 0039046 A1 | 7/2000 | |
| WO | 0039047 A1 | 7/2000 | |
| WO | 02055596 A1 | 7/2002 | |
| WO | 2011077232 A1 | 6/2011 | |
| WO | 2013142473 A1 | 9/2013 | |
| WO | 2014060286 A1 | 4/2014 | |
| WO | 2014128087 A1 | 8/2014 | |

OTHER PUBLICATIONS

International Search Report dated Oct. 20, 2016 for PCT/EP2016/069707.
The Written Opinion of the International Searching Authority dated Oct. 20, 2016 for PCT/EP2016/069707.

* cited by examiner

Primary Examiner — Pegah Parvini
(74) Attorney, Agent, or Firm — Schwegman Lundberg & Woessner, P.A.

(57) ABSTRACT

A process for the preparation of a mineral filler product is disclosed, the process comprising a step of dry grinding a calcium carbonate-comprising material in a mixture obtained by contacting the calcium carbonate-comprising material with at least one polydimethylsiloxane as grinding agent.

20 Claims, No Drawings

PROCESS FOR THE PREPARATION OF A MINERAL FILLER PRODUCT

CROSS-REFERENCE TO RELATED APPLICATIONS

This is a U.S. national phase of PCT Application No. PCT/EP2016/069707, filed Aug. 19, 2016, which claims priority to U.S. Provisional Application No. 62/207,978, filed Aug. 21, 2015 and European Application No. 15181911.7, filed Aug. 21, 2015.

The present invention relates to a mineral filler product which may be used in a multitude of applications, for example in polymer compositions, in paper making, paper coatings, agricultural applications, paints, adhesives, sealants, construction applications, food applications or cosmetic applications.

Well-known mineral fillers comprise, for example, natural ground calcium carbonate (GCC) and precipitated calcium carbonate (PCC).

For the preparation of GCC it has been quite common to use polymers such as polyalkylene glycols or polymers based on partially or totally neutralized polyacrylic acids, polymethacrylic acids, their derivatives and salts thereof, as grinding aids and dispersing agents in a grinding process to provide aqueous mineral suspensions.

In EP 2 029 677, a process for dry grinding a material containing a carbonate ore is described, said process includes the steps of dry grinding said material in at least one grinding unit in the presence of at least one polyalkylene glycol polymer in such manner that the quantity of water in the grinding unit is less than 10 wt.-%, based on the dry material in said grinding unit. The process may further comprise an optional classifying step, wherein both the grinding step and the latter classifying step may be carried out repeatedly with all or part of the material obtained in the dry grinding step and/or in the classifying step.

EP 2 132 268 provides a method for dry grinding of one or more mineral materials which include at least one calcium carbonate. The method includes the steps of crushing the mineral material(s) in at least one crushing unit, dry grinding the crushed material in at least one grinding unit in the presence of a comb-type hydrophilic polymer containing at least one polyalkylene oxide, wherein the quantity of liquid in the grinding unit is less than 15 wt.-%, based on the dry material crushed in said crushing unit. The process may further comprise an optional classifying step, wherein both the grinding step and the latter classifying step may be carried out repeatedly with all or part of the material obtained in the dry grinding step and/or in the classifying step.

WO 2011/077232 relates to the use of formulations containing glycerol and/or polyglycerols as an agent during dry grinding to improve the self-dispersing properties of said mineral material in an aqueous composition. The viscosity of the final composition is thus reduced and kept stable over time. Furthermore, the amount of foam formed during the dispersing step is reduced.

Silicon containing grinding aides for slag and clinker are described in WO 00/39046 and WO 00/39047.

Attempts have also been made to improve the applicability of particulate mineral materials and especially calcium carbonate-comprising mineral fillers, e.g., by treating such materials with higher aliphatic carboxylic acids, which in some cases may also be referred to as fatty acids, and aliphatic carboxylic acid salts. For instance, WO 00/20336 relates to an ultrafine natural calcium carbonate which may optionally be treated with one or more several fatty acids or one or more several salts, or mixtures thereof, and which is used as a rheology regulator for polymer compositions.

Likewise, U.S. Pat. No 4,407,986 relates to a precipitated calcium carbonate that is surface-treated with a dispersant that may include higher aliphatic acids and their metal salts in order to limit the addition of lubricant additives when kneading this calcium carbonate with crystalline polypropylene and to avoid the formation of calcium carbonate aggregates that limit the impact strength of the polypropylene.

In EP 0 325 114 relating to non-sagging underseal compositions for motor vehicles based on polyvinyl chloride which has improved rheological and adhesion properties, a mixture of an ammonium salt of 12-hydroxystearic acid in combination with a fatty acid (in a weight ratio of 1:1) is used to treat a mineral filler.

WO 02/055596 refers to a method for treating a mineral filler with a polydialkylsiloxane and a fatty acid, the resulting hydrophobic fillers and uses thereof in polymers for making films, in particular breathable films.

An at the time of filing the present application unpublished European patent application (application number: EP14156165.4, filed on Feb. 21, 2014) of the same applicant as the present application relates to a process for the preparation of a mineral filler product, the process comprises a step of dry grinding a calcium carbonate-containing material in a mixture obtained by contacting the calcium carbonate-containing material with at least one grinding agent selected from specific styrene-maleic anhydride co-polymers and/or specific derivatives of styrene-maleic anhydride co-polymers.

Polydimethylsiloxanes found various uses e.g. in the fields of cosmetics or medicine, as surfactants, as antifoaming agents, in hydraulic fluids or as food additive.

CN102220033 refers to a dry grinding method for obtaining superfine heavy calcium carbonate using a grinding aid and applying polydimethyl siloxane as an additional additive.

Furthermore, polydimethyl siloxanes are e.g. known from US 2004/0097616 or US 2013/0197142 as hydrophobizing agents.

Moreover, particulate mineral materials may also be treated with other surface-treatment agents, such as silanes, phosphates, phosphonates, oxalates, succinates, fluorides, natural or synthetic polymers, or mixtures thereof in order to hydrophobize the surface of said mineral material.

However, in many cases, the preparation of calcium carbonate-comprised mineral filler products by use of the aforementioned grinding agents and dispersants leads to a poor quality. For example, the use of grinding agents often results in a high water pick up susceptibility of the resulting mineral filler product. Particulate calcium carbonate-comprising materials having high moisture pick up susceptibilities may also be disadvantageous when used as filler in polymer compositions. For example, such materials may pick up moisture during storage, transportation, and/or processing which, in turn, may lead to the formation of voids in polymer compositions produced in a melt extrusion process.

Although related to a wet grinding process, EP 0 998 522 discloses suspensions being ground in the absence of dispersant or in presence of only sub-efficient amounts, which are then dried and used as a filler in polymer products. As a general rule, the prior art teaches to use neither any dispersant nor grinding agent for the either dry or wet grinding of calcium carbonate if intended for the use as a filler in polymer products.

In view of the foregoing, the expert is still faced with the problem of efficient production of dry ground fillers for the application in plastics, such as polyolefins, without a decrease in quality. Still today, dry grinding processes have several disadvantages. For example, the absence of grinding agents and dispersants results in a low throughput and low grinding efficiency which, in turn, leads to an overall increase in energy consumption or in coarse products. Furthermore, the residual grinding aids on the surface of the ground mineral material may have an effect on the end application either through physical or chemical interactions. Examples of such interactions are thermal decomposition, adsorption of humidity and interaction with other additives.

There is still a need to provide mineral filler products and processes for their preparation which may reduce or avoid one or more of the aforementioned technical drawbacks.

It is thus an object of the present invention to provide a process for the preparation of a mineral filler product which may be carried out under high throughput and high grinding efficiency. Another object may also be seen in the provision of a more efficient process for the provision of a mineral filler product having a relatively low moisture pick up susceptibility. Another object of the present invention is to provide a process for preparing a mineral filler product with high fineness, this means e.g. having a $d_{50}$-value in the range from 0.8 to 10.0 µm. Furthermore, it is an object of the present invention to provide a process allowing to manufacture a mineral filler product with low toxicity, which is not reactive or shows at least a reduced reactivity towards other reactive compounds e.g. amines. Another object of the present invention is the provision of a process for producing a VOC-free or at least mineral based filler having a very low VOC-content (VOC=volatile organic compound) and a further object of the present invention is the provision of such a mineral filler product. Another object of the present invention is to provide a process using reagents which are not flammable.

One or more of the foregoing and other problems are solved by the subject-matter as defined herein in the independent claims.

A first aspect of the present invention relates to a process for the preparation of a mineral filler product, said process comprising the steps of:
a) providing at least one calcium carbonate-comprising material;
b) providing at least one grinding agent;
c) dry grinding the at least one calcium carbonate-comprising material in a mixture obtained by contacting:
   i) the at least one calcium carbonate-comprising material provided in step a), with
   ii) the at least one grinding agent provided in step b) in at least one grinding unit to obtain a dry ground mineral filler; and
d) classifying the dry ground mineral filler of step c) to obtain a coarse fraction and a fine fraction, wherein the coarse fraction is removed or subjected to dry grinding step c) and the fine fraction represents a fine mineral filler;
wherein the total moisture content in the mixture of step c) is less than or equal to 10.0 wt.-%, based on the total weight of said mixture;
the amount of the at least one grinding agent provided in step b) ranges from 0.05 to 150 mg/m², based on the specific surface area of the calcium carbonate-comprising material as calculated based on the particle size distribution;
the temperature in step c) ranges from 45° C. to 200° C.; and the at least one grinding agent is a polydimethylsiloxane having a kinematic viscosity of 10 to 10 000 mm²/s.

According to the process of the present invention, the mineral filler product can be prepared from a calcium carbonate-comprising material, for example from marble, limestone, chalk, dolomite, and the like, in a dry grinding process. The present invention makes use of at least one polydimethylsiloxane as grinding agent. For this purpose, a calcium carbonate-comprising material is provided and subjected to a dry grinding step in a grinding unit (e.g., a ball mill) at elevated temperatures ranging from 45° C. to 200° C. The grinding agent may be contacted with said calcium carbonate-comprising material prior to the grinding step or during dry grinding. Upon addition of the grinding agent and during the grinding step, a layer may be formed on at least part of the surface of the dry ground mineral filler. Said layer may comprise the polydimethylsiloxane. Subsequently to the grinding step, the dry ground mineral filler is subjected to a classifying step. In said classifying step, the dry ground mineral filler is divided into a coarse fraction and a fine fraction. The coarse fraction may be removed or may be recycled by subjecting same again to dry grinding step c). In order to achieve optimal grinding efficiency and optimal quality of the obtainable mineral filler product, the at least one grinding agent has a kinematic viscosity of 10 to 10 000 mm²/s.

Another aspect of the present invention relates to a mineral filler product. Said product is obtainable by the process according to the present invention.

Still another aspect of the present invention relates to the use of the inventive mineral filler product in a polymer composition, in paper making, paper coatings, agricultural applications, paints, adhesives, sealants, construction applications, food packaging applications and/or cosmetic applications.

Another aspect of the present invention relates to the use of polydimethylsiloxane as grinding aid.

Advantageous embodiments of the process according to the present invention and embodiments of the mineral filler product obtainable by the process according to the present invention are defined in the corresponding subclaims.

According to one embodiment the process comprises a further step e) of drying the fine mineral filler of step d) to obtain a dried mineral filler having a total moisture content of less than 1.0 wt.-% based on the total weight of said dried mineral filler.

According to another embodiment the calcium carbonate-comprising material provided in step a) is selected from natural calcium carbonate sources and preferably is selected from the group consisting of marble, limestone, chalk, dolomite, and mixtures thereof.

According to another embodiment the amount of the at least one grinding agent provided in step b) ranges from 0.1 to 100.0 mg/m², preferably from 0.2 to 75.0 mg/m², and more preferably 0.3 to 5.0 mg/m² based on the specific surface area of the calcium carbonate-comprising material as calculated based on the particle size distribution.

According to another embodiment the at least one grinding agent provided in step b) has a kinematic viscosity of 15 to 800 mm²/s and preferably from 20 to 550 mm²/s.

According to another embodiment the at least one grinding agent provided in step b) is a linear polydimethylsiloxane.

According to another embodiment the total moisture content in the mixture of step c) is less than or equal to 5.0 wt.-%, preferably less than or equal to 2.0 wt.-%, and more preferably less than or equal to 1.0 wt.-%, based on the total weight of said mixture.

According to another embodiment the temperature in step c) ranges from 65° C. to 200° C., preferably from 75° C. to 160° C., and more preferably from 80° C. to 150° C.

According to another embodiment the fine mineral filler of step d) has a weight median particle size $d_{50}$ ranging from 0.4 to 40.0 µm, preferably from 0.6 to 20.0 µm, more preferably from 0.7 to 10.0 µm and even more preferably from 0.9 to 1.3 µm.

According to another embodiment the process comprises a further step of treating the fine mineral filler of step d) and/or the dried mineral filler of step e) with a hydrophobizing agent to obtain a surface-treated product having a treatment layer on at least part of the surface of said product.

According to another embodiment, said product has a volatile onset temperature of at least or equal to 200° C., preferably at least or equal to 225° C., more preferably at least or equal to 230° C., and even more preferably at least or equal to 250° C.

It should be understood that for the purposes of the present invention, the following terms have the following meanings:

The term "filler" in the meaning of the present invention refers to substances which may be added to materials, such as polymers, elastomers, paints, or adhesives, e.g. to lower the consumption of more expensive materials or to improve material or mechanical properties of the resulting products. The person skilled in the art very well knows the fillers, typically mineral fillers, used in the respective field.

The term "dry ground" or "dry grinding" in the meaning of the present invention refers to the comminution of a solid material by using a mill (e.g., by means of a ball mill), wherein said material to be ground has a total moisture content of less than or equal to 10 wt.-%, based on the total weight of said material.

The terms "coarse" and "fine" as used herein describe the particle size of two fractions of a particulate material relative to each other and, thus, do not imply a specific particle size or size range. Unless indicated otherwise, both terms refer to the relative weight median particle sizes $d_{50}$. In this respect, the term "fine fraction" indicates that the weight median particle size $d_{50}$ of said fraction is smaller than the weight median particle size $d_{50}$ of the corresponding "coarse fraction". The "fine fraction" has e.g. a weight median particle size ranging from 0.4 to 40 µm. Unless specified otherwise, the terms "drying" refers to a process according to which at least a portion of water is removed from a material to be dried such that a constant weight of the obtained "dried" material at 120° C. is reached. Moreover, a "dried" material may be further defined by its total moisture content which, unless specified otherwise, is less than or equal to 1.0 wt.-%, preferably less than or equal to 0.5 wt.-%, more preferably less than or equal to 0.2 wt.-%, and most preferably between 0.03 and 0.07 wt.-%, based on the total weight of the dried material.

The "total moisture content" of a material refers to the percentage of moisture (i.e. water) which may be desorbed from a sample upon heating to 150° C.

A "natural calcium carbonate source" may be any natural material comprising calcium carbonate. Such materials comprise, for example, marble, limestone, chalk, dolomite, and the like.

The "moisture pick up susceptibility" of a material refers to the amount of moisture absorbed on the surface of said material within a certain time upon exposure to a defined humid atmosphere and is expressed in mg/g. The "normalized moisture pick up susceptibility" of a material refers to the amount of moisture absorbed on the surface of said material within a certain time upon exposure to a defined humid atmosphere and is expressed in mg/m$^2$.

The term "volatile onset temperature" in the meaning of the present application refers to a temperature at which volatiles—including volatiles introduced as a result of the present process—begin to evolve, as observed on a thermogravimetric (TGA) curve, plotting the mass of remaining sample (y-axis) as a function of temperature (x-axis), the preparation and interpretation of such a curve being defined hereafter in the experimental part.

A "grinding agent" in the meaning of the present invention may be any compound which may be added prior to and/or during a grinding step (e.g., dry grinding) in order to enhance the grinding performance.

The term "hydrophobizing agent" in the gist of the present invention may be any compound which may be added after step d) and/or step e) to form a treatment layer formed on at least part of the surface of the obtained mineral filler product to increase the hydrophobicity of said filler.

Grinding agents in the meaning of the present invention are different from hydrophobizing agent and vice versa.

Throughout the present document, the "particle size" of an alkaline earth metal carbonate-comprising material, or other particulate material is described by its distribution of particle sizes. The value $d_x$ represents the diameter relative to which x % by weight of the particles have diameters less than $d_x$. This means that the $d_{20}$ value is the particle size at which 20 wt.-% of all particles are smaller, and the $d_{98}$ value is the particle size at which 98 wt.-% of all particles are smaller. The $d_{98}$ value is also designated as "top cut". The $d_{50}$ value is thus the weight median particle size, i.e. 50 wt.-% of all grains are bigger and the remaining 50 wt.-% are smaller than this particle size. For the purpose of the present invention the particle size is specified as weight median particle size $d_{50}$ unless indicated otherwise. For determining the weight median particle size $d_{50}$ value or the top cut particle size $d_{98}$ value a Malvern Mastersizer 3000 from the company Malvern Instruments Ltd., Great Britain, equipped with an Aero S dry powder disperser can be used. The method and the instrument are known to the skilled person and are commonly used to determine grain size of fillers and pigments. The following settings can be used for the measurements:

Air pressure: 4 bar, diffraction model: Fraunhofer, analysis model: universal, measurement time: 10 s, laser obscuration: 2.3%.

The surface area can be calculated based on the particle size distribution using the software provided by Malvern Instruments Ltd., Great Britain, for carrying out the measurement of the particle size distribution.

Unless stated otherwise, the "viscosity" of a polydimethylsiloxane as used herein refers to the kinematic viscosity as measured according to DIN 53019.

The "temperature" in step c) of the process according to the present invention refers to the temperature of the calcium carbonate-comprising material in the grinding chamber.

Where an indefinite or definite article is used when referring to a singular noun, e.g., "a", "an" or "the", this includes a plural of that noun unless anything else is specifically stated.

Where the term "comprising" is used in the present description and claims, it does not exclude other elements. For the purposes of the present invention, the term "consisting of" is considered to be a preferred embodiment of the term "comprising". If hereinafter a group is defined to comprise at least a certain number of embodiments, this is also to be understood to disclose a group, which preferably consists only of these embodiments.

Terms like "obtainable" or "definable" and "obtained" or "defined" are used interchangeably. This, e.g., means that, unless the context clearly dictates otherwise, the term "obtained" does not mean to indicate that, e.g., an embodiment must be obtained by, e.g., the sequence of steps following the term "obtained" though such a limited understanding is always included by the terms "obtained" or "defined" as a preferred embodiment.

According to the process of the present invention, a mineral filler product may be prepared from a calcium carbonate-comprising material. Said process comprises a dry grinding step which is carried out in the presence of at least one polydimethylsiloxane as grinding agent. The presence of said at least one grinding agent during dry grinding leads to a dry ground mineral filler which may provide a layer on at least a part of the surface of the dry ground mineral filler, wherein said layer may comprise said at least one grinding agent.

The inventors surprisingly found that the mineral filler product obtainable by the process according to the present invention provides several advantages. For example, the at least one polydimethylsiloxane may be used as a substitute for conventional grinding agents and dispersing agents, such as mono- or polyalkylene glycols or polyacrylates.

The problems described hereinabove with respect to the prior art may be solved by the process according to the present invention using efficient amounts of specific polydimethylsiloxane. The use of the grinding agents as described herein may result in higher mill capacities and a higher throughput. In turn, lower investments and smaller plant footprints for equal production capacities are required.

In the following, preferred embodiments of the process according to the present invention for the preparation of a mineral filler product will be discussed in more detail. It is to be understood that these details and embodiments also apply to the mineral filler product itself as well as to the use of said product in any of the disclosed applications.

Process Step a

According to step a) of the process according to the present invention, a calcium carbonate-comprising material is provided. In general, said calcium carbonate-comprising material may be any calcium carbonate source and may be of natural or synthetic origin.

In some embodiments of the process according to the present invention, the calcium carbonate-comprising material provided in step a) is selected from natural calcium carbonate sources, preferably containing from 50 to 98 wt.-% of calcium carbonate, based on the total weight of said calcium carbonate-comprising material.

According to one embodiment, the calcium carbonate-comprising material contains at least 50 wt.-%, preferably at least 70 wt.-%, more preferably at least 80 wt.-%, even more preferably at least 90 wt.-%, and most preferably from 90 to 98 wt.-% of calcium carbonate, based on the total weight of said calcium carbonate-comprising material.

According to another embodiment, the calcium carbonate-comprising material provided in step a) is selected from the group consisting of marble, limestone, chalk, dolomite, and mixtures thereof.

According to a preferred embodiment, the calcium carbonate-comprising material provided in step a) is selected from the group consisting of marble, limestone, chalk, and mixtures thereof.

In cases where the calcium carbonate is of synthetic origin, the calcium carbonate-comprising material may be precipitated calcium carbonate (PCC). A PCC in the meaning of the present invention is a synthesized material, generally obtained by precipitation following a reaction of carbon dioxide and calcium hydroxide (hydrated lime) in an aqueous environment or by precipitation of a calcium- and a carbonate source in water. Additionally, precipitated calcium carbonate can also be the product of introducing calcium and carbonate salts, calcium chloride and sodium carbonate, for example, in an aqueous environment. PCC may be vaterite, calcite or aragonite. PCCs are described, for example, in EP 2 447 213 A1, EP 2 524 898 A1, EP 2 371 766 A1, EP 2 840 065 A1, or WO 2013/142473 A1.

Suitably, the calcium carbonate-comprising material of step a) is provided as a solid material being in particulate form. In this respect, the calcium carbonate-comprising material provided in step a) may have any particle size distribution allowing the material to be subjected to a dry grinding step. Therefore, the calcium carbonate-comprising material may be provided as a comminuted material, for example, in crushed or pre-ground form.

According to one embodiment, the calcium carbonate-comprising material provided in step a) has a weight median particle size $d_{50}$ ranging from 5.0 to 600.0 μm and preferably from 50.0 to 300.0 μm.

Process Step b

According to step b) of the process according to the present invention, at least one grinding agent is provided.

The inventors surprisingly found that it is of particular advantage to use at least one polydimethylsiloxane as grinding agent.

The general formula of polydimethylsiloxanes is:

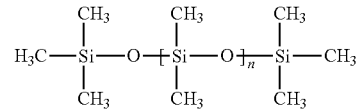

Suitable in the process according to the present invention are linear, branched, cyclic and/or cross-linked polydimethylsiloxanes and/or mixtures thereof, whereby linear polydimethylsiloxanes are preferred.

The kinematic viscosity of the polydimethylsiloxane as provided in step b) is in the range from 10 to 10 000 mm$^2$/s, preferably 15 to 800 mm$^2$/s and more preferably 20 to 550 mm$^2$/s.

A suitable polydimethylsiloxane is e.g. commercialized under the trade name Wacker® AK 350 (linear polydimethylsiloxane, kinematic viscosity=350 mm$^2$/s). Further suitable polydimethylsiloxanes are e.g. available from Sigma Aldrich (kinematic viscosity=20 mm$^2$/s, order number: 378348 and kinematic viscosity=500 mm$^2$/s, order number: 378380).

It is possible to use polydimethylsiloxanes in combination with other grinding agents, but in a preferred embodiment a polydimethylsiloxane is used as sole grinding agent.

According to one embodiment of the present invention, the at least one grinding agent is thus provided in undiluted form, preferably containing less than or equal to 5.0 wt.-%, more preferably less than or equal to 1.0 wt.-%, even more preferably less than or equal to 0.5 wt.-%, and most preferably from 0.001 to 0.2 wt.-% of water, based on the total weight of said at least one grinding agent.

The amount of the at least one grinding agent may be adjusted to the specific needs. In many cases, the amount of grinding agent may be based on the specific surface area of the carbonate-comprising material provided in step a). According to the present invention, the amount of said at least one grinding agent provided in step b) ranges from 0.05 to 150 mg/m$^2$, based on the specific surface area of the calcium carbonate-containing material as calculated based on the particle size distribution. Unless specifically stated, the amount of the at least one grinding agent is to be understood as a total amount. In cases where said grinding agent is added in one portion, the indicated amount thus refers to the amount of said one portion.

Accordingly, in cases where the grinding agent is added in more than one portions, the indicated amount thus refers to the total amount of said portions.

In one embodiment of the process according to the present invention, the amount of said at least one grinding agent provided in step b) ranges from 0.1 to 100.0 mg/m$^2$, preferably from 0.2 to 75.0 mg/m$^2$, and more preferably from 0.2 to 50.0 mg/m$^2$, based on the specific surface area of the calcium carbonate-comprising material as calculated based on the particle size distribution.

According to another embodiment, the amount of said at least one grinding agent provided in step b) ranges from 0.1 to 25.0 mg/m$^2$, preferably from 0.2 to 15.0 mg/m$^2$, more preferably from 0.3 to 5 mg/m$^2$ based on the specific surface area of the calcium carbonate-comprising material as calculated based on the particle size distribution.

However, the amount of said at least one grinding agent provided in step b) may also be based on the total dry weight of the calcium carbonate-comprising material provided in step a). According to one embodiment, the amount of said at least one grinding agent provided in step b) thus ranges from 0.05 to 5.0 wt.-%, preferably from 0.1 to 3.0 wt.-%, and more preferably from 0.15 to 2.0 wt.-%, based on the total dry weight of the calcium carbonate-comprising material.

According to another embodiment, the amount of said at least one grinding agent provided in step b) ranges from 0.01 to 1.0 wt.-%, preferably from 0.05 to 0.75 wt.-%, and more preferably from 0.1 to 0.5 wt.-%, based on the total dry weight of the calcium carbonate-comprising material.

Process Step c

According to step c) of the process according to the present invention, a mixture obtained by contacting the calcium carbonate-comprising material provided in step a) with the at least one grinding agent provided in step b) is dry ground in at least one grinding unit to obtain a dry ground mineral filler.

The term "dry ground" or "dry grinding" in the meaning of the present invention refers to the comminution of a solid material by using a mill (e.g., by means of a ball mill), wherein said material to be ground has a total moisture content of less than or equal to 20 wt.-%, based on the total weight of said material.

For the purposes of the present invention, any suitable mill known in the art may be used. However, said at least one grinding unit preferably is a ball mill. It has to be noted that step c) is carried out by using at least one grinding unit, i.e. it is also possible to use a series of grinding units which may, for example, be selected from ball mills, semi-autogenous mills, or autogenous mills. Suitable grinding equipment is e.g. described by Heinrich Schubert in 1975 ("Aufbereitung fester mineralischer Rohstoffe", volume 1; VEB Deutscher Verlag für Grundstoffindustrie Leipzig, third edition).

The amount of water being present in the mixture to be ground may be expressed by the total moisture content which is based on the total weight of said mixture. Typically, dry grinding processes are carried out using mixtures having a total moisture content of less than or equal to 10.0 wt.-%, based on the total weight of said mixture.

According to one embodiment, the total moisture content in the mixture of step c) is less than or equal to 5.0 wt.-%, preferably less than or equal to 2.0 wt.-%, and more preferably less than or equal to 1.0 wt.-%, based on the total weight of said mixture.

According to another embodiment, the total moisture content in the mixture of step c) is less than or equal to 5.0 wt.-%, preferably less than or equal to 2.0 wt.-%, and more preferably less than or equal to 1.0 wt.-%, based on the total weight of said mixture, wherein the total moisture content in the mixture of step c) preferably has a lower limit of 0.03 wt.-%, based on the total weight of said mixture.

According to still another embodiment of the process according to the present invention, the total moisture content in the mixture of step c) is less than or equal to 0.2 wt.-%, preferably less than or equal to 0.1 wt.-%, and more preferably between 0.03 and 0.07 wt.-%, based on the total weight of said mixture.

According to step c) of the process according to the present invention, a mixture obtained by contacting a calcium carbonate-comprising material with at least one grinding agent is dry ground in at least one grinding unit to obtain a dry ground mineral filler.

In this respect, it is possible to obtain the mixture to be ground in step c) of the process according to the present invention by contacting with each other the components provided in steps a) and b) prior to or during grinding step c). In addition, it is also possible to obtain said mixture by contacting with each other the components in one or more portions prior to or during grinding.

According to one embodiment, the mixture of grinding step c) is obtained prior to said grinding step by simultaneously contacting the calcium carbonate-comprising material provided in step a) with the at least one grinding agent provided in step b).

According to another embodiment, the mixture of grinding step c) is obtained prior to said grinding step by simultaneously contacting the calcium carbonate-comprising material provided in step a) with a first portion of the at least one grinding agent provided in step b), wherein a second portion of the at least one grinding agent is added during grinding step c).

It has further been found by the inventors that grinding step c) is preferably carried out at elevated temperatures. For the purposes of the process according to the present invention, a temperature ranging from 45° C. to 200° C. is particularly suitable.

According to another embodiment, the temperature in step c) ranges from 65° C. to 180° C., preferably from 75° C. to 160° C., and more preferably from 80° C. to 150° C.

Process step c) involves the dry grinding of a mixture obtained by contacting a calcium carbonate-comprising material and at least one grinding agent in at least one grinding unit to obtain a dry ground mineral filler.

In one embodiment, the dry ground mineral filler obtained after grinding step c) has a weight median particle $d_{50}$ ranging from 0.5 to 100.0 µm and preferably from 1.0 to 30.0 µm.

Process Step d

The dry ground mineral filler obtained in process step c) is subsequently subjected to classifying step d).

In said classifying step, the dry ground mineral filler of step c) is divided into at least two fractions, i.e. into a coarse fraction and a fine fraction.

A classifying step in general serves to divide a feed fraction having a certain particle size into a coarse fraction and a fine fraction each having different particle sizes. Typically, the coarse fraction has a $d_{50}$ value being higher than that of the feed fraction, whereas the fine fraction has a $d_{50}$ value being smaller than that of the feed fraction. For this purpose, screening devices as well as gravity-based devices, such as centrifuges or cyclones and any combination of the aforementioned devices may be used.

According to one embodiment, the dry ground mineral filler of step c) is classified using a cyclone.

According to another embodiment, the fine mineral filler of step d) has a weight median particle size $d_{50}$ ranging from 0.4 to 40.0 µm, preferably from 0.6 to 20.0 µm, more preferably from 0.7 to 10.0 µm and even more preferably from 0.9 to 1.3 µm.

As already described above, the dry ground mineral filler of step c) is classified in step d) to obtain a coarse fraction and a fine fraction, wherein the coarse fraction is removed or subjected to dry grinding step c) and the fine fraction represents a fine mineral filler which may represent the final product or may be used in one or more following optional process step.

To also use the coarse fraction obtained in classifying step d), said coarse material may be recycled. Therefore, in a preferred embodiment, the coarse fraction of step d) is subjected to dry grinding step c).

Process Step e

The process according to the present invention further comprises an optional drying step e). In said drying step, the fine mineral filler obtained in classifying step d) is dried to obtain a dried mineral filler.

In some cases, the total moisture content in the mixture of dry grinding step c) may be very low. In these cases, for example, where the total moisture content in the mixture of step c) is less than or equal to 0.2 wt.-%, preferably less than or equal to 0.1 wt.-%, and more preferably in the range from 0.03 to 0.07 wt.-%, based on the total weight of said mixture, the process according to the present invention does not comprise any drying step after classifying step d).

In another embodiment the drying step e) is carried out during dry grinding step c) by using the heat generated during the grinding for subsequently evaporation of water.

Therefore, according to one embodiment, the process for the preparation of a mineral filler product comprises the steps of:
  a) providing at least one calcium carbonate-comprising material;
  b) providing at least one grinding agent;
  c) dry grinding the at least one calcium carbonate-comprising material in a mixture obtained by contacting:
    i) the at least one calcium carbonate-comprising material provided in step a), with
    ii) the at least one grinding agent provided in step b) in at least one grinding unit to obtain a dry ground mineral filler; and
  d) classifying the dry ground mineral filler of step c) to obtain a coarse fraction and a fine fraction, wherein the coarse fraction is removed or subjected to dry grinding step c) and the fine fraction represents a fine mineral filler;

wherein the total moisture content in the mixture of step c) is less than or equal to 10 wt.-%, based on the total weight of said mixture;

the amount of the at least one grinding agent provided in step b) ranges from 0.05 to 150 mg/m², based on the specific surface area of the calcium carbonate-comprising material as measured by the BET nitrogen method;

the temperature in step c) ranges from 45° C. to 200° C.; and the at least one grinding agent is a polydimethylsiloxane having a kinematic viscosity of 10 to 10 000 mm²/s.

The mixture of step c) may also have a higher total moisture content but still being less than or equal to 10 wt.-%, based on the total weight of said mixture. For example, the total moisture content of said mixture may be less than or equal to 5.0 wt.-%, preferably less than or equal to 2.0 wt.-%, and more preferably less than or equal to 1.0 wt.-%, based on the total weight of said mixture. In these cases, a drying step following step c) may be mandatory in order to obtain a dried mineral filler having a total moisture content of less than 1.0 wt.-%, based on the total weight of said dried mineral filler.

According to another embodiment, the process for the preparation of a mineral filler product thus comprises the steps of:
  a) providing at least one calcium carbonate-comprising material;
  b) providing at least one grinding agent;
  c) dry grinding the at least one calcium carbonate-comprising material in a mixture obtained by contacting:
    i) the at least one calcium carbonate-comprising material provided in step a), with
    ii) the at least one grinding agent provided in step b) in at least one grinding unit to obtain a dry ground mineral filler; and
  d) classifying the dry ground mineral filler of step c) to obtain a coarse fraction and a fine fraction, wherein the coarse fraction is removed or subjected to dry grinding step c) and the fine fraction represents a fine mineral filler; and
  e) drying the fine mineral filler of step d) to obtain a dried mineral filler having a total moisture content of less than 1.0 wt.-%, based on the total weight of said dried mineral filler;

wherein the total moisture content in the mixture of step c) is less than or equal to 10.0 wt.-%, based on the total weight of said mixture;

the amount of the at least one grinding agent provided in step b) ranges from 0.05 to 150 mg/m², based on the specific surface area of the calcium carbonate-comprising material as calculated based on the particle size distribution;

the temperature in step c) ranges from 45° C. to 200° C.; and the at least one grinding agent is a polydimethylsiloxane having a kinematic viscosity of 10 to 10 000 mm²/s.

Typically, the drying step according to the process of the present invention may be carried out by any drying method known to the skilled person.

According to one embodiment, drying step e) is a spray drying step, preferably said spray drying step is carried out at a tower temperature ranging from 90° C. to 130° C. and preferably from 100° C. to 120° C.

By means of drying step e), a dried mineral filler is obtained having a low total moisture content which is less than or equal to 1.0 wt.-%, based on the total weight of said dried mineral filler.

According to another embodiment, the dried mineral filler of step e) has a total moisture content of less than or equal to 0.5 wt.-% and preferably less than or equal to 0.2 wt.-%, based on the total weight of said dried mineral filler.

According to still another embodiment, the dried mineral filler of step e) has a total moisture content of between 0.01 and 0.15 wt.-%, preferably between 0.02 and 0.10 wt.-%, and more preferably between 0.03 and 0.07 wt.-%, based on the total weight of said dried mineral filler.

Optional Treatment Step

Independently from whether the process according to the present invention comprises an optional drying step or not, the process may further comprise an optional step of treating (also referred to as "treatment step") the fine mineral filler obtained in step d) and/or the dried mineral filler obtained in step e) with at least one hydrophobizing agent. By means of said treatment step, a treatment layer is formed on at least part of the surface of the obtained mineral filler product.

Therefore, according to one embodiment, the process for the preparation of a mineral filler product comprises the steps of:

According to another embodiment, the process for the preparation of a mineral filler product thus comprises the steps of:
a) providing at least one calcium carbonate-comprising material;
b) providing at least one grinding agent;
c) dry grinding the at least one calcium carbonate-comprising material in a mixture obtained by contacting:
  i) the at least one calcium carbonate-comprising material provided in step a), with
  ii) the at least one grinding agent provided in step b) in at least one grinding unit to obtain a dry ground mineral filler; and
d) classifying the dry ground mineral filler of step c) to obtain a coarse fraction and a fine fraction, wherein the coarse fraction is removed or subjected to dry grinding step c) and the fine fraction represents a fine mineral filler; and
e) optionally drying the fine mineral filler of step d) to obtain a dried mineral filler having a total moisture content of less than 1.0 wt.-%, based on the total weight of said dried mineral filler;
f) optionally treating the fine mineral filler of step d) and/or the dried mineral filler of step e) with a hydrophobizing agent to obtain a surface-treated product having a treatment layer on at least part of the surface of said product;
wherein the total moisture content in the mixture of step c) is less than or equal to 10.0 wt.-%, based on the total weight of said mixture;
the amount of the at least one grinding agent provided in step b) ranges from 0.05 to 150 mg/m$^2$, based on the specific surface area of the calcium carbonate-comprising material as calculated based on the particle size distribution;
the temperature in step c) ranges from 45° C. to 200° C.; and
the at least one grinding agent is a polydimethylsiloxane having a kinematic viscosity of 10 to 10 000 mm$^2$/s.

Said hydrophobizing agent used in the optional treatment step may be any agent known to the skilled person which is capable to form a hydrophobic treatment layer on at least part of the surface of a mineral filler product. The hydrophobizing agent is different from the grinding agent as provided in step b).

In one embodiment, the hydrophobizing agent is selected from the group consisting of fatty acids having from 6 to 24 chain carbon atoms, mono-substituted succinic anhydrides, alkyl phosphoric acid esters, polyhydrogensiloxane, and mixtures thereof.

Suitable hydrophobising agents and methods for preparing surface-treated filler products thereof are, for example, described in EP 2 159 258 A1, EP 2 390 285 A1, EP 2 390 280 A1, WO 2014/060286 A1 and WO 2014/128087 A1.

In one embodiment, the hydrophobising agent is an aliphatic carboxylic acid having a total amount of carbon atoms from $C_4$ to $C_{24}$ and/or reaction products thereof. The term "reaction products" of the aliphatic carboxylic acid in the meaning of the present invention refers to products obtained by contacting the modified mineral-based filler with the at least one aliphatic carboxylic acid. Said reaction products are formed between at least a part of the at least one aliphatic carboxylic acid and reactive molecules located at the surface of the alkaline earth metal carbonate-comprising material particles.

The aliphatic carboxylic acid in the meaning of the present invention may be selected from one or more straight chain, branched chain, saturated, unsaturated and/or alicyclic carboxylic acids. Preferably, the aliphatic carboxylic acid is a monocarboxylic acid, i.e. the aliphatic carboxylic acid is characterized in that a single carboxyl group is present. Said carboxyl group is placed at the end of the carbon skeleton.

In one embodiment of the present invention, the aliphatic carboxylic acid is selected from saturated unbranched carboxylic acids, that is to say the aliphatic carboxylic acid is preferably selected from the group of carboxylic acids consisting of pentanoic acid, hexanoic acid, heptanoic acid, octanoic acid, nonanoic acid, decanoic acid, undecanoic acid, lauric acid, tridecanoic acid, myristic acid, pentadecanoic acid, palmitic acid, heptadecanoic acid, stearic acid, nonadecanoic acid, arachidic acid, heneicosylic acid, behenic acid, tricosylic acid, lignoceric acid and mixtures thereof.

In another embodiment of the present invention, the aliphatic carboxylic acid is selected from the group consisting of octanoic acid, decanoic acid, lauric acid, myristic acid, palmitic acid, stearic acid, arachidic acid and mixtures thereof. Preferably, the aliphatic carboxylic acid is selected from the group consisting of myristic acid, palmitic acid, stearic acid and mixtures thereof. For example, the aliphatic carboxylic acid is stearic acid.

According to another embodiment, the hydrophobizing agent is an alkenyl succinic anhydride. According to still another embodiment, the hydrophobizing agent is an alkyl phosphoric acid ester. Methods for treating a calcium carbonate-comprising material with these hydrophobising agents are described, for example, in EP 2 722 368 A1 and EP 2 770 017 A1.

The term "succinic anhydride", also called dihydro-2,5-furandione, succinic acid anhydride or succinyl oxide, has the molecular formula $C_4H_4O_3$ and is the acid anhydride of succinic acid. The term "mono-substituted succinic anhydride" in the meaning of the present invention refers to a succinic anhydride wherein a hydrogen atom is substituted by another substituent.

The term "reaction products of at least one mono-substituted succinic anhydride" in the meaning of the present invention refers to products obtained by contacting an alkaline earth metal carbonate-comprising material with one or more mono substituted succinic anhydride(s). Said salty reaction products are formed between the mono-substituted succinic acid which is formed from the applied mono-substituted succinic anhydride and reactive molecules located at the surface of the alkaline earth metal carbonate-comprising material.

The term "phosphoric acid mono-ester" in the meaning of the present invention refers to an o-phosphoric acid molecule mono-esterified with one alcohol molecule selected from unsaturated or saturated, branched or linear, aliphatic or aromatic alcohols having a total amount of carbon atoms from $C_6$ to $C_{30}$, preferably from $C_8$ to $C_{22}$, more preferably from $C_8$ to $C_{20}$, and most preferably from $C_8$ to $C_{18}$ in the alcohol substituent. The term "phosphoric acid di-ester" in the meaning of the present invention refers to an o-phosphoric acid molecule di-esterified with two alcohol molecules selected from the same or different, unsaturated or saturated, branched or linear, aliphatic or aromatic alcohols having a total amount of carbon atoms from $C_6$ to $C_{30}$, preferably from $C_8$ to $C_{22}$, more preferably from $C_8$ to $C_{20}$, and most preferably from $C_8$ to $C_{18}$ in the alcohol substituent.

The term "salty reaction products of a phosphoric acid ester or blend of one or more phosphoric acid mono-esters and/or one or more phosphoric acid di-esters" in the meaning of the present invention refers to products obtained by contacting an alkaline earth metal carbonate-comprising material with one or more phosphoric acid mono-ester and one or more phosphoric acid di-ester and optionally phosphoric acid. Said salty reaction products are formed between the applied one or more phosphoric acid mono-ester and one or more phosphoric acid di-ester and optionally phosphoric acid and reactive molecules located at the surface of the alkaline earth metal carbonate-comprising material.

According to still another embodiment, the hydrophobizing agent is selected from polyhydrogensiloxane and mixtures thereof.

In some embodiments of the process according to the present invention, the temperature in the treatment step ranges from 70° C. to 140° C., preferably from 75° C. to 130° C., and more preferably from 80° C. to 125° C.

In some cases, the treatment step may be carried out directly at the end of the drying step. In one embodiment, drying step e) is thus carried out in a drying unit comprising a drying chamber and the hydrophobizing agent of step f) is contacted with the dried mineral filler by direct injection of said agent into the drying chamber.

Throughput

In the sense of the present invention the throughput is the amount of final product (fine ground calcium carbonate) removed out of the grinding circuit after the classification step a) per hour.

The use of the grinding agents according to step b) allows to carry out the process with a high throughput, this means in a more economical way than when using prior art grinding agents.

The Mineral Filler Product

As already described above, the moisture pick up susceptibility of a material refers to the amount of moisture absorbed on the surface of said material and is expressed in mg moisture/g absorbed on a sample upon exposure to a defined humid atmosphere. In this respect, the fine mineral filler obtainable after classifying step d) and/or optional drying step e) may have a moisture pick up susceptibility of less than or equal to 12.0 mg/g, preferably of less than or equal to 10.0 mg/g, and most preferably less than or equal to 8.0 mg/g.

By means of the process according to the present invention, a low total volatiles content and, in particular, a high volatile onset temperature may be achieved.

In one embodiment, the mineral filler product according to the present invention may have a volatile onset temperature of at least or equal to 200° C., preferably at least or equal to 225° C., more preferably at least or equal to 230° C. and even more preferably at least or equal to 250° C. These values likewise refer to the fine mineral filler of step d) of the process according to the present invention, to the dried mineral filler of drying step e) and to the product obtainable by the optional treatment step.

In still another embodiment, the mineral filler product according to the present invention may have a specific surface area calculated based on the particle size distribution in the range from 1 to 7 $m^2/g$ and preferably 2.5 to 4.5 $m^2/g$.

The inventive mineral filler product may be used in a polymer composition, in paper making including packaging and boards, paper coatings, agricultural applications, paints, adhesives, sealants, construction applications, food applications, and/or cosmetic applications, preferably said mineral filler product is used in a polymer composition.

As the mineral filler product has a low moisture pick up susceptibility, it may advantageously be used in paper coatings in order to adjust the printing properties of a coated paper. Furthermore, the mineral filler product may also be used in exterior paints and bathroom paints. Since the mineral filler product according to present invention is not toxic it is suitable for food packaging applications.

A number of the aforementioned applications (e.g., for coatings or paints) involve the preparation of an aqueous slurry comprising the mineral filler product obtainable by the process according to the present invention. Such aqueous slurries may be easily prepared from the inventive mineral filler product by the addition of water to obtain slurries having a solids content of, for example, from 10.0 to 85.0 wt.-%, based on the total weight of said slurry.

The use of the mineral filler product according to the present invention as a filler material in polymer applications may also be of particular advantage. For example, said filler may be used in thermoplastic polymers, such as polyvinyl chloride, polyolefins, and polystyrene which may allow an increased filler load as compared to conventional calcium carbonate fillers.

Moreover, the mineral filler product may also be used in polymer coatings which may be applied on the surface of polymer articles, such as foils, in order to increase the hydrophobicity (e.g., reflected by an increased contact angle measured against water) of said surface.

According to one embodiment, the mineral filler product is used in a polymer composition, wherein said polymer composition comprises:
 a) at least one polymeric resin; and
 b) from 0.1 to 90.0 wt.-%, preferably from 1.0 to 85.0 wt.-%, and more preferably from 2.0 to 45.0 wt.-%, based on the total weight of said polymer composition, of the mineral filler product obtainable by the process according to the present invention.

According to another embodiment, said at least one polymeric resin is a thermoplastic resin and preferably is a polyolefin, polyvinylchloride, or polystyrene.

According to another embodiment, said at least one polymeric resin is a polyolefin and preferably polyethylene or polypropylene.

According to still another embodiment, said at least one polymeric resin is polyvinylchloride.

According to still another embodiment, said at least one polymeric resin is polystyrene.

The polymer composition of the present invention may be used in a number of processes including the manufacture of blown films, sheets, or pipe profiles, in processes such as extrusion of pipes, profiles, cables, fibres or the like, and in compression moulding, injection moulding, thermoforming, blow moulding, rotational moulding, etc. In this respect, said polymer composition may be directly used in the manufacture of polymer articles. Therefore, in one embodiment of the present invention, the polymer composition comprises the mineral filler product in an amount of from 1 to 50 wt.-%, preferably of from 5 to 45 wt.-% and most preferably from 10 to 40 wt.-%, based on the total weight of the polymer composition.

In an alternative embodiment, the polymer composition may be used as a master batch.

The term "master batch" refers to a composition having a concentration of the mineral filler product that is higher than the concentration in the polymer composition used for preparing the final application product. That is to say, the master batch is further diluted such as to obtain a polymer composition which is suitable for preparing the final application product.

For example, a polymer composition according to the present invention suitable to be used as a master batch comprises the mineral filler product in an amount of from 50 to 95 wt.-%, preferably from 60 to 95 wt.-%, and more preferably from 70 to 95 wt.-%, based on the total weight of the polymer composition.

EXAMPLES

The scope and interest of the invention may be better understood on basis of the following examples which are intended to illustrate embodiments of the present invention. However, they are not to be construed to limit the scope of the claims in any manner whatsoever.

1 Measurement Methods

In the following the measurement methods implemented in the examples are described.

Moisture Pick Up Susceptibility

The moisture pick up susceptibility of a material as referred to herein is determined in mg moisture/g after exposure to an atmosphere of 10 and 85% relative humidity, respectively, for 2.5 hours at a temperature of +23° C. (±2° C.). For this purpose, the sample is first kept at an atmosphere of 10% relative humidity for 2.5 hours, then the atmosphere is changed to 85% relative humidity at which the sample is kept for another 2.5 hours. The weight increase between 10 and 85% relative humidity is then used to calculate the moisture pick-up in mg moisture/g of sample.

The moisture pick up susceptibility in mg/g divided by the specific surface area in $m^2/g$ (calculated based on the particle size distribution) corresponds to the "normalized moisture pick up susceptibility" expressed in $mg/m^2$ of sample.

Volatile Onset Temperature

The "volatile onset temperature" has been determined by analysis of the thermogravimetric analysis (TGA) curve. TGA analysis described hereafter—begin to evolve, as observed on a TGA curve, plotting the mass of remaining sample (y-axis) as a function of temperature (x-axis), the preparation and interpretation of such a curve being defined hereafter. TGA analytical methods provide information regarding losses of mass and volatile onset temperatures with great accuracy, and is common knowledge; it is, for example, described in "Principles of Instrumental analysis", fifth edition, Skoog, Holler, Nieman, 1998 (first edition 1992) in Chapter 31 pages 798 to 800, and in many other commonly known reference works. TGA is performed using a Mettler Toledo TGA 851 based on a sample of 500+/−50 mg and scanning temperatures from 25 to 550° C. at a rate of 20° C./minute under an air flow of 70 ml/min.

The skilled man will be able to determine the "volatile onset temperature" by analysis of the TGA curve as follows: the first derivative of the TGA curve is obtained and the inflection points thereon between 150 and 350° C. are identified. Of the inflection points having a tangential slope value of greater than 45° relative to a horizontal line, the one having the lowest associated temperature above 150° C. is identified. The temperature value associated with this lowest temperature inflection point of the first derivative curve is the "volatile onset temperature".

Particle Size Distribution (Mass % Particles with a Diameter<X) and Weight Median Diameter ($d_{50}$) and the Specific Surface Area of a Particulate Material The particle size distribution of the products was measured using a Malvern Mastersizer 3000 (Malvern Instruments Ltd., Great Britain) equipped with an Aero S dry powder disperser. The software version 3.20 is used. The following settings were used for the measurements:

Air pressure: 4 bar
Diffraction model: Fraunhofer
Analysis model: universal
Measurement time: 10 s (3 independent measurements are performed and the average value is reported)
Laser obscuration: 2.3%

The surface area is calculated based on the particle size distribution using the software provided by Malvern Instruments Ltd., Great Britain, for carrying out the measurement of the particle size distribution.

Kinematic Viscosity

The kinematic viscosity has been measured according to DIN 53019.

Humidity of Calcium Carbonate

A 10 g powder sample has been heated in an oven at 150° C. until the mass is constant for 20 minutes. The mass loss has been expressed as wt.-% loss based on the initial sample mass. This mass loss has been attributed to the sample humidity.

2 Starting Materials

The following starting materials have been used for the examples:

Italian marble having an average diameter of approx. 5 cm was crushed using a hammer mill. The size distribution of the crushed material was determined by sieving and is given in Table 1 herein below.

TABLE 1

Particle size distribution of crushed marble.

| Particle size fraction | wt.-% |
|---|---|
| >1 mm | 28.3 |
| 0.5 to 1 mm | 8.7 |
| 200 to 500 μm | 18.3 |
| 100 to 200 μm | 18.1 |
| 50 to 100 μm | 11.6 |
| <50 μm | 15.0 |

The details of the grinding agents used are summarized in Table 2 below.

TABLE 2

Grinding agents.

| Compound | Chemical description | Tradename/Supplier |
|---|---|---|
| Grinding agent 1 (inventive) | Polydimethylsiloxane (CAS 63148-62-9), kinematic viscosity = 20 mm$^2$/s$^a$ | Sigma Aldrich (order number 378348) |
| Grinding agent 2 (inventive) | Polydimethylsiloxane (CAS 63148-62-9), kinematic viscosity = 500 mm$^2$/s$^a$ | Sigma Aldrich (order number 378380) |
| Grinding agent 3 (inventive) | Polydimethylsiloxane (CAS 63148-62-9), kinematic viscosity = 350 mm$^2$/s$^a$, linear | Wacker® AK 350 |
| Grinding agent 4 (comparative) | Monopropylene glycol (CAS 57-55-6) | Technical grade |
| Grinding agent 5 (comparative) | Glycerol (CAS 56-81-5) | Technical grade |

$^a$Taken from technical data sheet.

3 Examples

3.1 General Procedure

The crushed material was contacted with one of the grinding agents summarized above immediately before grinding and mixed in a concrete mixer for at least 10 min.

The obtained material was then transferred into a ball mill (Hosokawa™ Ball Mill S.O. 80/32) using 100 kg of cylindrically shaped iron grinding balls, having an average diameter of 16 mm in order to obtain a ground material having a weight median particle size $d_{50}$ of less than or equal to 1.0 μm.

The outlet of the grinding chamber was equipped with an opening of 20×5 mm$^2$ discharging to an Alpine Turboplex™ 100 ATP classifier. The classifier was adjusted in order to recover the fine fraction having a desired weight median particle size $d_{50}$ such as between 1 and 1.2 μm. The remaining coarse material having a weight median particle size $d_{50}$ being higher than said desired value is sent back to the mill feed.

The dry grinding was performed in a continuous fashion, wherein approx. 15 kg of material were constantly present in the system. Thus, the mill feed was continuously fed with a quantity of crushed material and/or coarse fraction material resulting from the classifying step material which was equal to the quantity of the fine fraction leaving the system.

The system was operated until constant amounts of material having a suitable quality could be recovered by monitoring the grinding capacity and the grinding energy. The grinding chamber is heated to a constant temperature of 80° C.

The throughput in kg/h is defined as the quantity of the final product (particles size distribution as described in table 3 below) which is removed from the system.

TABLE 3

Grinding agent, throughput and product characteristics.

| Example no. | Grinding agent type | Amount of grinding agent [mg/m$^2$] | Throughput [kg/h] | Final product: Particle size distribution $d_{10}$ [μm] | $d_{50}$ [μm] | $d_{98}$ [μm] | Specific surface area [m$^2$/g] | Volatile onset [° C.] | Water pick-up [mg/g] | Humidity [wt.-%] |
|---|---|---|---|---|---|---|---|---|---|---|
| 1 (comp.) | — | 0 | 1.0 | 0.33 | 1.35 | 15.79 | 3.14 | — | 4.8 | 0.35 |
| 2 (inv.) | 1 | 0.43 | 2.4 | 0.34 | 1.13 | 18.31 | 3.47 | 230 | 7.0 | 0.35 |
| 3 (inv.) | 2 | 0.50 | 2.2 | 0.34 | 1.12 | 4.77 | 2.99 | 269 | 6.9 | 0.51 |
| 4 (inv.) | 3 | 0.45 | 3.0 | 0.32 | 1.08 | 19.24 | 3.32 | n.d. | 6.2 | 0.38 |
| 5 (comp.) | 4 | 0.49 | 2.0 | 0.33 | 1.08 | 6.17 | 3.10 | 177 | 6.4 | 0.46 |
| 6 (comp.) | 5 | 0.44 | 1.6 | 0.33 | 1.12 | 4.8 | 3.39 | 180 | 8.5 | 0.35 | a) Humidity of the feed material = 0.02 wt.-% (low surface area), n.d. = not determined.

As can be gathered from Table 3 the throughput without the use of a grinding agent is much lower (comparison of Example 1 with Examples 2 to 6). The grinding agents according to the invention enable the improvement in throughput with respect to the grinding agents known in the prior art (comparison Examples 2 to 4 with Examples 5 and 6). The products manufactured by applying grinding agents according to the present invention show a higher volatile onset temperature than the products manufactured by using prior art grinding agents (comparison Examples 2 and 3 with Examples 5 and 6). Furthermore, the water-pick up of the products ground with the grinding agents according to the present invention are in the same range than products ground with grinding agents known in the prior art.

The invention claimed is:

1. A process for the preparation of a mineral filler product, the process comprising the steps of:
    a) providing at least one calcium carbonate-comprising material;
    b) providing at least one grinding agent;
    c) dry grinding the at least one calcium carbonate-comprising material in a mixture obtained by contacting:
        i) the at least one calcium carbonate-comprising material provided in step a), with
        ii) the at least one grinding agent provided in step b) in at least one grinding unit to obtain a dry ground mineral filler; and
    d) classifying the dry ground mineral filler of step c) to obtain a coarse fraction and a fine fraction, wherein the coarse fraction is removed or subjected to dry grinding step c) and the fine fraction represents a fine mineral filler;
    wherein the total moisture content in the mixture of step c) is less than or equal to 10.0 wt.-based on the total weight of said mixture;
    the amount of the at least one grinding agent provided in step b) ranges from 0.05 to 150 mg/m², based on the specific surface area of the calcium carbonate-comprising material as calculated based on the particle size distribution;
    the temperature in step c) ranges from 45° C. to 200° C.; and
    the at least one grinding agent is a polydimethylsiloxane having a kinematic viscosity of 10 to 10 000 mm²/s.

2. The process according to claim 1, comprising a further step e) of drying the fine mineral filler of step d) to obtain a dried mineral filler having a total moisture content of less than 1.0 wt. % based on the total weight of said dried mineral filler.

3. The process according to claim 1, wherein the calcium carbonate-comprising material provided in step a) is selected from natural calcium carbonate sources and preferably is selected from the group consisting of marble, limestone, chalk, dolomite, and mixtures thereof.

4. The process according to claim 1, wherein the amount of said at least one grinding agent provided in step b) ranges from 0.1 to 100.0 mg/m² based on the specific surface area of the calcium carbonate-comprising material as calculated based on the particle size distribution.

5. The process according to claim 1, wherein the at least one grinding agent provided in step b) has a kinematic viscosity of 15 to 800 mm²/s.

6. The process according to claim 1, wherein the at least one grinding agent provided in step b) is a linear polydimethylsiloxane.

7. The process according to claim 1, wherein the total moisture content in the mixture of step c) is less than or equal to 5.0 wt. % based on the total weight of said mixture.

8. The process according to claim 1, wherein the temperature in step c) ranges from 65° C. to 200° C.

9. The process according to claim 1, wherein the fine mineral filler of step d) has a weight median particle size $d_{50}$ ranging from 0.4 to 40.0 µm.

10. The process according to claim 2, wherein the process comprises a further step of treating the fine mineral filler of step d) and/or the dried mineral filler of step e) with a hydrophobizing agent.

11. A mineral filler product obtainable by a process according to claim 1.

12. The mineral filler product according to claim 11, wherein said product has a volatile onset temperature of at least or equal to 200° C.

13. A product comprising the mineral filler product according to claim 11, wherein the product is selected from the group consisting of a polymer composition, paper, paper coatings, agricultural products, paints, adhesives, sealants, construction products, food packaging products and cosmetic products.

14. A polymer composition comprising
    a) at least one polymeric resin; and
    b) from 0.1 to 90.0-wt. %, based on the total weight of said polymer composition of the mineral filler product according to claim 11.

15. The process according to claim 4, wherein the amount of said at least one grinding agent provided in step b) ranges from 0.2 to 50.0 mg/m² based on the specific surface area of the calcium carbonate-comprising material as calculated based on the particle size distribution.

16. The process according to claim 5, wherein the at least one grinding agent provided in step b) has a kinematic viscosity of 20 to 550 mm²/s.

17. The process according to claim 7, wherein the total moisture content in the mixture of step c) is less than or equal to 1.0 wt.-% based on the total weight of said mixture.

18. The process according to claim 8, wherein the temperature in step c) ranges from 80° C. to 150° C.

19. The process according to claim 9, wherein the fine mineral filler of step d) has a weight median particle size $d_{50}$ ranging from 0.7 to 10.0 µm.

20. The mineral filler product according to claim 12, wherein said product has a volatile onset temperature of at least to 250° C.

* * * * *

UNITED STATES PATENT AND TRADEMARK OFFICE
CERTIFICATE OF CORRECTION

PATENT NO. : 10,961,397 B2  
APPLICATION NO. : 15/751773  
DATED : March 30, 2021  
INVENTOR(S) : Rentsch et al.

Page 1 of 1

It is certified that error appears in the above-identified patent and that said Letters Patent is hereby corrected as shown below:

On the Title Page

In item (73), in "Assignee", in Column 1, Lines 1-2, delete "Blue Ash, OH (US)" and insert --Oftringen (CH)-- therefor In the Claims In Column 21, Line 34, in Claim 1, delete "10.0 wt.-based" and insert --10.0 wt.-%, based-- therefor In Column 22, Line 32, in Claim 14, delete "comprising" and insert --comprising;-- therefor Signed and Sealed this  
Eighth Day of June, 2021

Drew Hirshfeld  
*Performing the Functions and Duties of the*  
*Under Secretary of Commerce for Intellectual Property and*  
*Director of the United States Patent and Trademark Office*